United States Patent [19]
Urmson

[11] Patent Number: 5,408,439
[45] Date of Patent: Apr. 18, 1995

[54] MONOLITHIC CONSTRUCTION OF WAVEGUIDE TUBES

[76] Inventor: John Urmson, 3807 Harrison, Oakland, Calif. 94612

[21] Appl. No.: 985,866

[22] Filed: Dec. 4, 1992

[51] Int. Cl.6 .............................................. G01S 15/00
[52] U.S. Cl. ...................................................... 367/1
[58] Field of Search .................. 73/24.01, 61.49, 597, 73/644, 861.18; 367/127, 138, 1; 340/632; 181/194, 196, 207, 208, 224

[56] References Cited

U.S. PATENT DOCUMENTS

| 4,783,997 | 11/1988 | Lynnworth | 73/644 |
| 4,962,826 | 10/1990 | House | 181/207 |
| 5,060,507 | 10/1991 | Urmson et al. | 73/24.01 |

Primary Examiner—Daniel T. Pihulic
Attorney, Agent, or Firm—Bruce & McCoy

[57] ABSTRACT

A method and apparatus for acoustic energy cancellation in waveguide tube assemblies which enables monolithic construction thereof.

10 Claims, 2 Drawing Sheets

MONOLITHIC CONSTRUCTION OF WAVEGUIDE TUBES

CROSS-REFERENCE TO RELATED PATENT

This invention is related to U.S. patent Ser. No. 5,060,507, entitled "Method and Apparatus for Fluid Mixture Monitoring, Constituent Analysis, and Composition Control," issued Oct. 29, 1991, to Urmson, et al.

BACKGROUND OF THE INVENTION

1. Field of the Invention

The present invention relates to a specialized improvement in the apparatus used for fluid mixture monitoring, constituent analysis, and composition control, as disclosed and described in the referenced patent. More particularly, it relates to a monolithic or integral construction of an acoustic waveguide tube as disclosed in said patent and to a method and apparatus for undesired acoustic energy cancellation in waveguide tube assemblies.

The acoustic waveguide tube disclosed in the referenced patent is a sensor utilizing measurements derived from the velocities of sound in fluids, usually gases. It is comprised of an elongated chamber for containing a test fluid and having a means for generating, in response to an electrical impulse, sound waves at one end of the chamber. Receiving transducers at the other end of the chamber convert the sound waves into electrical impulses to permit measurement of time of flight of the sound waves. As a result, time of flight measurements of sound in different fluids can be obtained.

There exist many commercial uses for the invention disclosed in the referenced patent in which the fluids must be maintained at the highest possible levels of purity. Specifically, in electronic device manufacturing, "micro-contamination" or adulteration of process fluids with even extremely minute amounts of unwanted chemicals or particulate material has been identified as causing deleterious effects on resulting device quality and process yields. In other applications, it is important that process fluids be completely sealed within an instrument of integral construction to prevent any possible exposure to potential sources of combustion.

It has therefore been determined that it is advantageous if the acoustic waveguide tubes used in the patented instruments are of monolithic construction so as to eliminate the possibility of microcontamination or leakage of the contained fluids. In this context, monolithic construction is defined to mean that the containment chamber of the waveguide tube, which is the essential component of the instrument, be made an integral structure whereby it comprises a unitary element which cannot be disassembled into a subparts without invasive deconstruction.

2. Description of the Prior Art

In acoustic chambers used to contain fluids in which sound wave time of flight measurements are made, unwanted oscillations result from mechanical coupling between the sound wave sending and receiving elements, causing the latter to begin to oscillate during the time of flight of sound waves through the contained fluids. In other words, sound waves may travel through the containment chamber material to the receiving transducers faster than sound waves travel through the contained fluids.

Prior to the present invention, the best state of the art in construction of acoustic chambers included the use of "O" rings, threaded joints between dissimilar materials, and the use of visco-elastic materials in their construction for the purpose of reducing the amplitude of such unwanted oscillations in the receiving transducers. Examples of such construction are described in the referenced patent.

In related fields, active techniques have been disclosed in engineering literature for attenuating interfering acoustic energy by utilizing subsequent pulses of the sending transducers. Such techniques, utilized in such fields as medical imaging instrumentation or ambient sound cancellation, have been found to be impractical when applied to waveguide tubes of monolithic construction.

The present invention, a passive technique, vastly improves the state of the art by enabling the forming and functioning of acoustic waveguide chambers from a single piece of solid material, thus eliminating all possible diffusion paths between the outside environment and the fluids contained within. Acoustic waveguide tubes of the present invention can be fabricated of glass, ceramics, stainless steel, or other corrosion resistant material, with all parts fused or welded together and the transducing elements located externally so they do not contact the contained fluids.

SUMMARY OF THE INVENTION

The present invention permits the construction of a monolithic acoustic waveguide tube. It is comprised in part of an elongated chamber having two ends. Fluid inlet and outlet ports are formed in the chamber to provide fluid flow therein whereby sound waves traveling in the fluid encounter equal distance of equal velocity but opposite direction fluid flow. End caps of the same material as the chamber are secured and sealed to the ends of the chamber. Transducing assemblies are disposed external to the chamber and are acoustically coupled to the end caps. A multiple of attenuators are mechanically secured to the chamber with intimate friction and conforming contact and with relatively constant pressure therealong. The attenuators are comprised of a similar material having nearly the same velocity of sound carrying capability as, and several times the mass of, the chamber.

The invention is also an apparatus for undesired acoustic energy cancellation in an elongated chamber. The apparatus comprises a multiple of attenuators made of a material having nearly the same velocity of sound carrying capability as the chamber. The attenuators are mechanically secured to the chamber, in close proximity to each other, with intimate friction and conforming contact and with relatively constant pressure therealong. The total mass of the attenuators is several times the mass of the chamber.

The invention also includes a method of undesired acoustic energy cancellation in acoustic instrumentation wherein the measurements are based on the sensing of sound waves. The method comprises forming an elongated monolithic containment chamber, and providing fluid flow therein whereby sound waves traveling in the fluid encounter equal distances of equal velocity but opposite direction fluid flow. A multiple of attenuators are secured to the chamber with intimate friction and conforming contact with relatively constant pressure therealong. The attenuators are comprised of a similar material having nearly the same velocity of sound carrying capability, and several times the mass of, the chamber.

OBJECTS OF THE INVENTION

It is therefore an important object of the present invention to provide an acoustic waveguide tube of monolithic construction to better contain dangerous and corrosive fluids, prevent microcontamination of the test fluids, and prevent exposure of the contained fluids to sources of combustion.

It is another object of the present invention to provide an acoustic waveguide tube which permits the sound transducing elements to be located external to the transmission chamber which contains the test fluid.

It is a further object of the present invention to provide an apparatus which effects undesirable acoustic energy cancellation in waveguide tube assemblies to allow monolithic construction thereof.

It is yet another object of the present invention to provide in acoustic instrumentation, where the measurements are based on the sensing of sound waves, a method for canceling undesirable acoustic energy induced into the instrumentation by the measurement procedures.

It is yet a further object of the present invention to provide a means to reliably detect the precise moment of arrival of acoustic waves transmitted through fluids contained in acoustic waveguide tubes of monolithic construction.

It is still another object of the present invention to provide an apparatus which in addition to canceling undesirable acoustic energy in acoustic instrumentation also provides temperature equalization for multiple waveguide tubes for accurate sound velocity comparisons.

It is still a further object of the present invention to provide acoustic energy cancellation in acoustic instrumentation with apparatus which is totally passive.

Other objects and advantages of the present invention will become apparent when the method and apparatus of the present invention are considered in conjunction with the accompanying drawings.

DESCRIPTION OF THE PREFERRED EMBODIMENT

Figure 1:
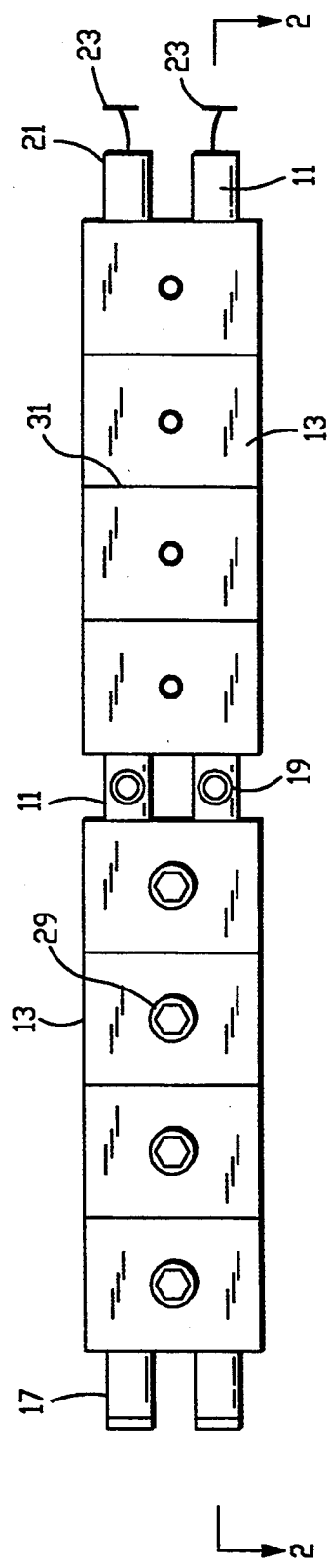
FIG. 1 is a top plan view of an acoustic waveguide tube of the present invention.

Reference is made to the drawings for a description of the preferred embodiment of the present invention wherein like reference numbers represent like elements on corresponding views.

Waveguide Tube Assembly

A waveguide tube of monolithic construction inherently forms an acoustic couple between the sound generating and receiving elements. As a result, there exists in the waveguide tube during the time of flight of sound intervals, a train of mechanical waves with vibrational displacement occurring along the length axis of the tube. Due to the usually greater velocity of sound in the material of construction of the tube, the coupled acoustic waves arrive at the receiving transducer prior to the acoustic waves transmitted through the contained fluid. When the fluids are gaseous, that portion of the acoustic signal traveling through material of construction is of much greater energy due to higher acoustic impedance of the solid structure than of the contained gaseous fluid. Generally, these phenomena result in the receiving transducer sensing what is herein referred to as "interfering acoustic energy" or oscillations of such amplitude that the moment of arrival of the sound waves transmitted through the fluids is unreliably detected.

The present invention provides a means to attenuate the undesired acoustic energy from the waveguide tube allowing the receiving transducers to remain in a quiescent state, thereby providing for reliable and accurate time of flight measurements. The means employed by the invention is mechanical, passive, and uses only the acoustic energy itself to accomplish its own cancellation. Essentially, it is an apparatus and method for acoustic energy cancellation in an elongated chamber. It is comprised, in part, of a multiple of attenuators made of a material similar to that of the chamber. They are mechanically secured to the chamber, in close proximity to each other, with intimate friction and conforming contact and with relatively constant pressure along the chamber. The total mass of the attenuators is several times the mass of the chamber.

In a preferred embodiment of the acoustic waveguide tube assembly of the present invention, there are two principal parts: the monolithic waveguide tube containment chamber 11 and the attenuators 13 which are secured to the chamber. The tube portion is formed of a corrosion resistant material, preferably stainless steel. However, glass and some ceramic compositions have good corrosion resistance and the principles disclosed herein are applicable to those materials.

The acoustic waveguide tube of the assembly is comprised in part of a monolithic elongated chamber 13 having two ends. It can be formed of a wide variety of configurations of length over diameter ratios as set forth in the related U.S. Patent. However, an actual unit is described herein to provide relative proportions for the sound attenuators since the size parameters of the attenuators 13 have not been determined. The sample waveguide tube is one foot (30.5 cm) in length, three-eighths ($\frac{3}{8}$) of an inch (0.95 cm) in diameter, and weighs approximately 110 grams.

Figure 2:
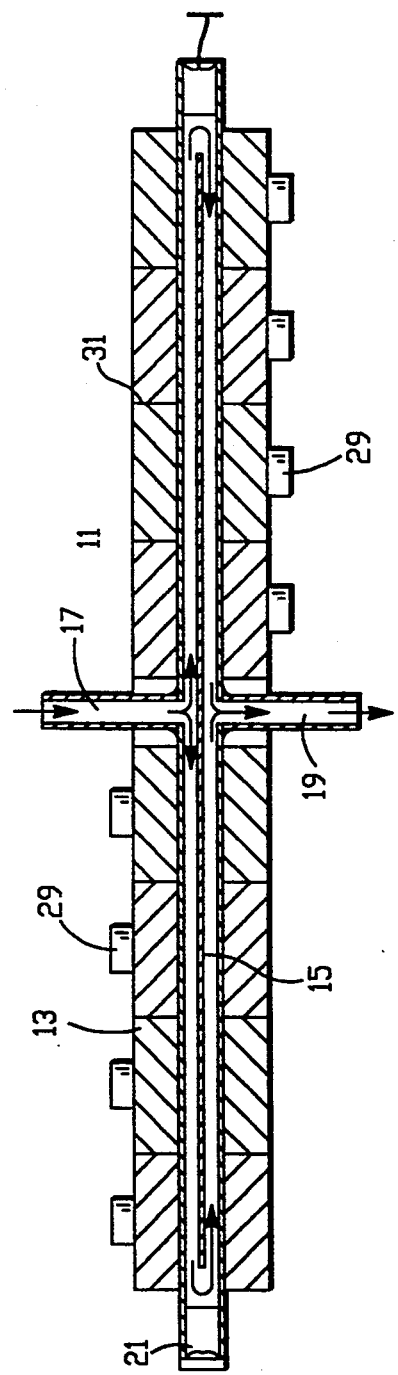
FIG. 2 is a side elevation in cross-section of the acoustic waveguide tube of FIG. 1.

The waveguide tube fluid containment chamber 11 is designed to provide fluid flow therethrough in a manner whereby sound waves traveling in the fluid in the chamber encounter equal distances of equal velocity but opposite direction fluid flow to neutralize the effect on time of flight measurements of gas flowing through the chamber. In the preferred embodiment of the invention, as illustrated in FIG. 2, a septum 15 is disposed in the chamber and is composed of a thin sheet of the same material as the tube. Its length is slightly shorter than that of the chamber whereby it extends short of either end of the tube to allow fluid flow therearound. In an alternate embodiment, fluid flow could be inletted to the chamber from a manifold to opposite ends of the chamber and exhausted at an outlet disposed midway between the two inlets. Other configurations will achieve the same result.

In the preferred embodiment of FIG. 2, fluid inlet and outlet ports, 17 & 19 respectively, are formed in the chamber 11 on opposite sides of the septum 15 proximate the center thereof. The ports are short lengths of tube welded to the chamber. The septum is inserted into the tube perpendicular to the inlet and outlet ports so as to form two fluid flow paths within the tube assembly and to cause fluid to flow at equal velocity but in opposite directions toward and from the ends thereof as illustrated by the arrows in FIG. 2. Since sound waves traversing the flowing fluid encounter equal distances of fluid flowing at equal velocity in opposite directions, the effects of fluid flow on time of flight measurements are canceled. Other configurations of waveguide tubes utilizing the same principle are contemplated, such as coiling the tubes to achieve a more desirable form factor in which case inletting the fluids from the ends of the tube would be more desirable than using a septum.

End caps 21 formed of the same metal or material as the tube are secured and sealed to the ends thereof to form the monolithic chamber 11. In the preferred embodiment, the end caps are also stainless steel and are attached to the ends of the waveguide tube by laser welding. The end caps may be flat or conical shape to better resist deformation resulting from changes in pressure of the process fluids contained within the waveguide tube.

Sound generating and receiving apparatus herein referred to as transducing assemblies are acoustically coupled to the end caps 21 and are formed to resonate at the same frequency as the end caps, or the thickness to diameter ratio of the end caps is selected so that they resonate at the same frequency as the transducing assemblies. A unique and important feature of this design is that the transducing elements are disposed external to the chamber 11. Mechanical hammers, actuated by magnetically controlled springs, may be used as sound generating transducer assemblies (not shown) to maximize the received signal and to minimize the amplitude build-up therein which occurs when transducers are employed as described in the related patent. A more accurate determination of the sound wave arrival can be made when the sound generating end cap is actuated by a mechanical hammer because the hammer causes a higher voltage to occur in the measuring equipment at initiation than a transducer.

Ceramic transducer disks with resonant and anti-resonant frequencies in the range of 40 Khz, which are standard items of commerce, are used as receiving transducers 23. The transducer is acoustically coupled to the end caps by a coupler 25 which can be a short piece of wire or a post welded or soldered to the end cap 21 and the transducer. The sound energy generated by the sending unit is measured by the receiving element.

The Attenuators

An important feature of the invention is embodied in the attenuators 13 which surround the waveguide tube chambers 11 as illustrated in FIG. 1. A multiple of attenuators are mechanically secured to and surround the chamber with intimate friction and conforming contact. These attenuators are solid mass blocks of similar material to the chamber. The term "similar material" as used herein, and in the appended claims, means that the material has nearly the same velocity of sound carrying capability as that of the acoustic waveguide tube material. The blocks are machined to conform to the surface of the chamber and for that purpose are formed with cylindrical receptacle surfaces therein which fit closely around the external surface of the cylindrical waveguide tube. The attenuators are made in two pieces for several reasons. They are easy to manufacture as each half is of nearly identical configuration (except the end halves); they can be easily fitted around the waveguide tubes; and they are easy to secure together with adjustable pressure on the waveguide tube because they are simply bolted together.

The blocks 13 are clamped around the tubes 11 with relatively constant pressure along the chamber due to the intimate contact. It has been found that securing the attenuators too tightly to the chamber eliminates the acoustic energy cancellation. The same result occurs if the attenuators are secured too loosely. It is a matter of trial and error to determine how tightly the attenuators should be secured, but there is a wide range of pressure in which attenuation occurs and the optimum pressure is easily determined by experimentation. When fewer attenuators are employed, the pressure on the friction fit in each attenuator is more critical to optimal operation. Standard machining techniques render satisfactory surface finishes to the outer wall of the waveguide tubes and to the semi-cylindrical surface of the attenuator half for satisfactory friction contact, and the surface profile so rendered appears to not be a critical factor in acoustic energy cancellation.

In the preferred embodiment, the attenuators 13 are made of mild steel for ease of machining and in total have a mass at least several times the mass of the stainless steel chamber 11. When the attenuators are constructed of materials having different velocity of sound carry capability than those of the material forming the waveguide tubes, energy cancellation has been found to be less effective. The attenuators are positioned closely adjacent to each other along the length of the tube. The ones disposed at the opposite ends of the tube extend beyond or overhang the ends thereof and are formed to provide recesses 27 to permit the acoustic couplers and the transducing assemblies to be housed therein.

In the preferred embodiment, a pair of waveguide tubes 11 is clamped in the attenuator blocks 13 as shown in FIG. 1 with a clamping bolt 29 disposed between the two tubes and threaded into one-half of an attenuator. There are several advantages to this arrangement. Generally, several chambers will be mounted in attenuators designed to hold two or more units. The attenuators serve as mounts for the acoustic waveguide tubes and provide a means for ease of handling several chambers secured together by the attenuators as a single assembly. Most importantly, however, is the fact that the attenuators can function as a heat sink to equalize the temperatures in all of the waveguide tube chambers to enhance the accuracy of velocity of sound measurement comparisons in the different chambers.

The combined mass of the individual attenuators 13 is substantially greater than and several times that of the combined mass of the chambers 11 to which the attenuators are clamped, but the attenuator dimensions and configurations do not appear to be critical to their operation. Neither does the length of the individual attenuator appear to be of great significance. However, the rectangle configuration of the attenuators has been selected as an optimum for several reasons. It is easy to machine; it permits the maximum number of attenuators of any selected size to be attached to a waveguide tube; and it provides flat surfaces in the attenuators which are disposed perpendicular to the longitudinal axis of the chamber. It is believed that the end walls 31 of the attenuators, which are the flat surfaces oriented perpendicular to the longitudinal axis of the chamber, serve as reflecting surfaces for the sound waves which are induced in the attenuators by the frictional surface contact with the acoustic waveguide tube while it is conducting sound waves. The attenuators could also have a circular or oval cross-section taken perpendicular to the longitudinal axis of the chamber and still be considered rectangular if the cross-section surfaces are flat.

In the sample assembly, eight attenuators 13 of 1-inch (2.54 cm) length, ¾-inch (1.9 cm) thickness, and 1½-inch (3.8 cm) height are used on a pair of waveguide tubes 13 one foot (30.5 cm) in length. The eight attenuators are machined from mild steel and each is maintained in frictional contact with the waveguide tubes by tension provided by a single bolt 29 tightened to approximately the same torque as the other attenuators. A pair of attenuator halves is required to form one attenuator and to clamp onto opposite sides of two chambers as illustrated in FIG. 1. Each half attenuator weighs approximately 110 grams (unintentionally approximately the same weight as an acoustic waveguide tube). In this configuration, more than 120 decibels of attenuation are obtained.

Figure 3:
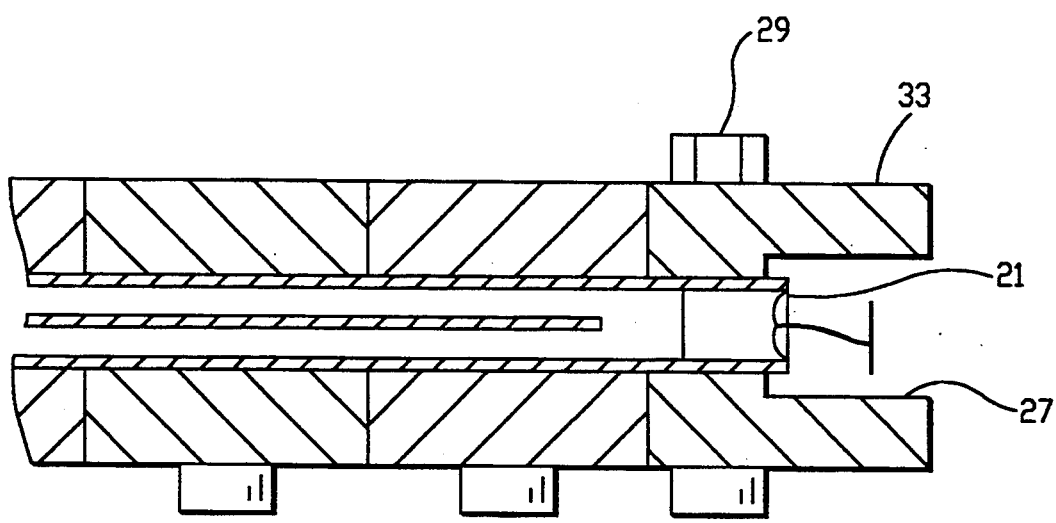
FIG. 3 is a side elevation in cross-section of an alternative embodiment of one end of the acoustic waveguide tube of FIGS. 1 & 2.

A preferred assembly configuration, illustrated in FIG. 3, utilizes the same frictional contact principle but at the end attenuators 33 has reduced area of contact between the attenuator body and the chamber 11. This configuration permits a length of attenuator body to be greater than that of the frictional contact with the chamber whereby the bodies of the attenuators which extend beyond the ends of the waveguide tubes create a cavity 27 which forms an electrically and mechanically shielded location for the transducing assemblies. Therefore, a preferred acoustic waveguide tube assembly for a pair of chambers is comprised of two attenuators 33 as illustrated in FIG. 3, mounted at the ends of the waveguide tubes, and the block of eight attenuators 13 mounted along the length of the tubes as shown in FIG. 1. In such an assembly, approximately 140 decibels of acoustic attenuation are obtained.

Remote Transducer Mounting

Reference is made to FIG. 3. The transducing assemblies 23, 25 are located remote or external to the waveguide tubes, but internally of the end attenuators 33 secured around the chamber 11, and are acoustically coupled to the end caps 21. The receiving transducer coupler 25 is a short piece of wire, stainless steel in the preferred embodiment, approximately one inch in length, but may be of other material. The wires are soldered to the thin nickel coating of the transducer 23, and to the stainless steel end caps 21, or otherwise mechanically connected, to create the acoustic couple. The wire is stiff enough to function as a rigid post whereby sound waves which actuate the end caps are longitudinally transmitted to or from the transducers depending on whether they are functioning as a generator or receiver. The short time of flight of sound waves through the coupler wire is calculated, added to the digital number representing the time between the moment of arrival of sound waves at the end of the waveguide tube and their detection, and the sum subtracted from the total time of flight measurement during signal processing. Reference is made to the related U.S. Patent for a complete description. This arrangement is a new and novel means of remoting transducers for acoustic waveguide tube instrumentation.

For the sound generating transducing assembly, a mechanical hammer sound generator unit may be substituted and secured so as to strike the end cap 21 when actuated and the coupler is eliminated. The purpose of the cavity in the attenuators is to contain and protect the delicate and sensitive transducers, end caps, acoustic couplers, and sound generating assemblies.

Operation

Mechanical pulses originate at the sending or sound generating transducing element as a result of electronic actuation. The pulses deform the tube end cap 21 so as to create sound waves in the contained fluid. The sound waves are propagated through the contained fluid and, after a time of flight delay, impinge on the opposite end cap producing mechanical pulses in the coupler wire 25 and receiving transducer 23 which are transduced into electrical signals. During the time of flight delay, interfering and undesired acoustic energy is attenuated by the present invention to a level that allows detection of the first positive going pulse of the acoustic signal by the detection mechanism.

During the soundwave time of flight interval, the friction resulting from mechanical contact between the outer surfaces of the waveguide tubes 11 and the attenuators 13 brings the attenuators into acoustic vibration with waves induced in the attenuators alongside those travelling in the waveguide tubes. In this process, some of the acoustic energy is converted into heat by said friction contact between the tubes and the attenuator. As the induced waves reach the ends of the attenuators 31, they are reflected, reversing both their direction and phase. As said reflected waves travel through the attenuators, they cause displacements opposite in both direction and velocity to those in the waveguide tube body at every point of contact between the two with the result that the wave energies are converted into heat by friction. The friction, being identical at every point of contact for displacements in both directions, causes all of the acoustic energy transferred to the attenuators to be converted into heat by the time the reflected waves reach the opposite ends of the attenuators.

Method of Acoustic Energy Cancellation

The present invention also contemplates the method of undesired acoustic energy cancellation in waveguide tube assemblies to enable proper functioning of a fluid containment chamber of said tube of monolithic construction. The steps comprise, in part, securing to the chamber a multiple of solid masses of several times the mass of the chamber, and of similar material to the chamber, to the surface thereof with conforming contact. Friction is established and maintained between the tube and the masses by bringing the surfaces thereof into intimate contact and maintaining the contact with constant pressure along the chamber. Acoustic energy is then transferred between the chamber and the masses through the friction established by the contact resulting in a diminished level of acoustic energy registered at the sound receiving assembly.

Conclusion

Thus it will be apparent from the foregoing description of the invention in its preferred form that it will fulfill all the objects and advantages attributable thereto. While it is illustrated and described in considerable detail herein, the invention is not to be limited to such details as have been set forth except as may be necessitated by the appended claims.

I claim:

1. An acoustic waveguide tube assembly comprising
a monolithic elongated chamber having two ends,
fluid inlet and outlet ports formed in said chamber to provide fluid flow therein whereby sound waves traveling in said fluid encounter equal distances of equal velocity but opposite direction fluid flow,
end caps of the same material as said chamber secured and sealed to the ends thereof,
transducing assemblies disposed external to said chamber and acoustically coupled to said end caps, and
a multiple of attenuators mechanically secured to said chamber along substantially the entire length thereof with intimate friction and conforming contact with relatively constant pressure along said chamber, said attenuators being secured to said chamber in close proximity to each other and being comprised of a similar material having nearly the same velocity of sound carrying capability as said chamber and totalling in weight several times the mass of said chamber.

2. The acoustic waveguide tube assembly of claim 1 wherein said attenuators are attached to at least two or more waveguide tube chambers.

3. The acoustic waveguide tube assembly of claim 1 wherein the attenuators disposed at the opposite ends of the chamber extend beyond the ends thereof and are formed with recesses to permit the transducing assemblies to be housed therein.

4. An acoustic waveguide tube assembly comprising
at least a pair of elongated chambers having two ends on each chamber,
a septum disposed in each of said chambers and extending short of the respective ends thereof,
fluid inlet and outlet ports formed in said chambers on opposite sides of said septums proximate the centers thereof,
end caps of the same material as said chambers secured and sealed to the ends thereof,
transducing assemblies disposed external to said chambers and acoustically coupled to said end caps,
a multiple of attenuators mechanically secured to said chambers along substantially the entire length thereof with intimate friction and conforming contact and with relatively constant pressure along said chambers, said attenuators being secured to said chambers in adjacent abutting relation and being comprised of a similar material as said chambers having nearly the same velocity of sound carrying capability and totalling in weight several times the combined masses of said chambers, the end attenuators disposed at opposite ends of said chambers extending beyond the ends thereof and formed with recesses to permit the transducing assemblies to be housed therein.

5. An apparatus for undesired acoustic energy cancellation in an elongated chamber comprising
a multiple of attenuators, made of a material having nearly the same velocity of sound carrying capability as said chamber, mechanically secured thereto, in close proximity to each other, with intimate friction and conforming contact and relatively constant pressure therealong, the total mass of said attenuators being several times the mass of said chamber.

6. The apparatus of claim 5 wherein the attenuators disposed at the opposite ends of said chamber extend beyond the ends thereof and are formed with recesses to provide electrical and mechanical shielding for housing instrumentation apparatus.

7. The apparatus of claim 6 wherein the chamber is made of stainless steel round tube and the attenuators are generally rectangular blocks of steel having a machined semi-cylindrical receptacle surface formed therein which fits closely around said chamber and multiple pairs of said blocks are clamped in adjacent abutting relation around said chamber.

8. The method of undesired acoustic energy cancellation in acoustic instrumentation wherein the measurements are based on the sensing of sound waves comprising
forming an elongated monolithic containment chamber,
providing fluid flow in said chamber whereby sound waves traveling in said fluid encounter equal distances of equal velocity but opposite direction fluid flow,
securing a multiple of attenuators to said chamber in close proximity to each other with intimate friction and conforming contact with relatively constant pressure along said chamber, said attenuators being comprised of a similar material having nearly the same velocity of sound carrying capability and several times the mass of said chamber.

9. The method of undesired acoustic energy cancellation in an acoustic waveguide tube to enable proper functioning of a monolithic fluid containment chamber in said tube comprising
securing to said tube a multiple of solid masses of several times the mass of said tube, and of similar material to said tube, to the surface thereof with conforming contact surfaces and in close proximity to each other, said material having nearly the same velocity of sound carrying capability as that of said tube,
establishing and maintaining friction between said tube and said masses by bringing said surfaces thereof into intimate contact and maintaining said contact with constant pressure along said chamber, and
transferring acoustic energy between said chamber and said masses through the friction established by said contact, resulting in a diminished level of acoustic energy registered at the sound receiving assembly of the tube.

10. The method of claim 9 including clamping a multiplicity of said tubes within a multiplicity of said attenuators, said attenuators keeping the multiplicity of tubes at the same temperature through heat transfer.

* * * * *